United States Patent [19]
Nick et al.

[11] 3,808,882
[45] May 7, 1974

[54] ENGINE TORQUE CONTROL SYSTEM

[75] Inventors: Charles F. Nick; Morris J. Davidson, both of Houston, Tex.

[73] Assignee: Dresser Industries, Inc., Dallas, Tex.

[22] Filed: July 21, 1971

[21] Appl. No.: 164,555

[52] U.S. Cl.......... 73/117.3, 73/136 R, 123/140 MC
[51] Int. Cl............................................ G01m 15/00
[58] Field of Search.......... 73/117.3, 116, 114, 134, 73/136 R; 417/274; 235/150.2, 150.21; 318/433

[56] References Cited
UNITED STATES PATENTS

| | | | |
|---|---|---|---|
| 2,982,128 | 5/1961 | Gibson et al........................ | 73/117 |
| 2,685,198 | 8/1954 | Saul, Sr............................... | 73/113 |
| 3,024,964 | 3/1962 | Emmel................................. | 417/274 |
| 3,287,965 | 11/1966 | Brahm et al....................... | 73/117.3 |
| 3,377,848 | 4/1968 | Marvin................................ | 73/117.3 |
| 3,407,658 | 10/1968 | Kerbow et al............. | 235/151.34 X |
| 3,456,497 | 7/1969 | Eberl................................... | 73/116 |

OTHER PUBLICATIONS

Dipaolo, S. J., Unique Computer System Monitors Aircraft Engines, From Electronics, Vol. 36, No. 2, 1-11-63.

*Primary Examiner*—Jerry W. Myracle
*Attorney, Agent, or Firm*—John N. Hazelwood; William E. Johnson, Jr.

[57] ABSTRACT

The engine horsepower is computed as a function of the engine fuel flow rate and the engine torque is derived by the division of the horsepower signal by a signal functionally related to the engine speed. The actual torque of the engine is compared to a torque set point and upon a given deviation from the set point, corrective signals are actuated to return the actual torque to its set point. Upon too great a deviation, an alarm is actuated and the engine is completely unloaded. When used with ambient up-rated engines, a temperature signal representing engine capability is used to limit the torque set point to its maximum allowable setting. Upon loss of the signal representing engine capability, the allowable torque is reduced as though there were no up-rating of the engine.

The fuel flow computer utilizes signals from the differential pressure of the fuel, the static pressure of the fuel and the temperature of the fuel to produce a signal indicative of the square root of the product of the two pressure parameters divided by a signal functionally related to the fuel temperature.

9 Claims, 11 Drawing Figures

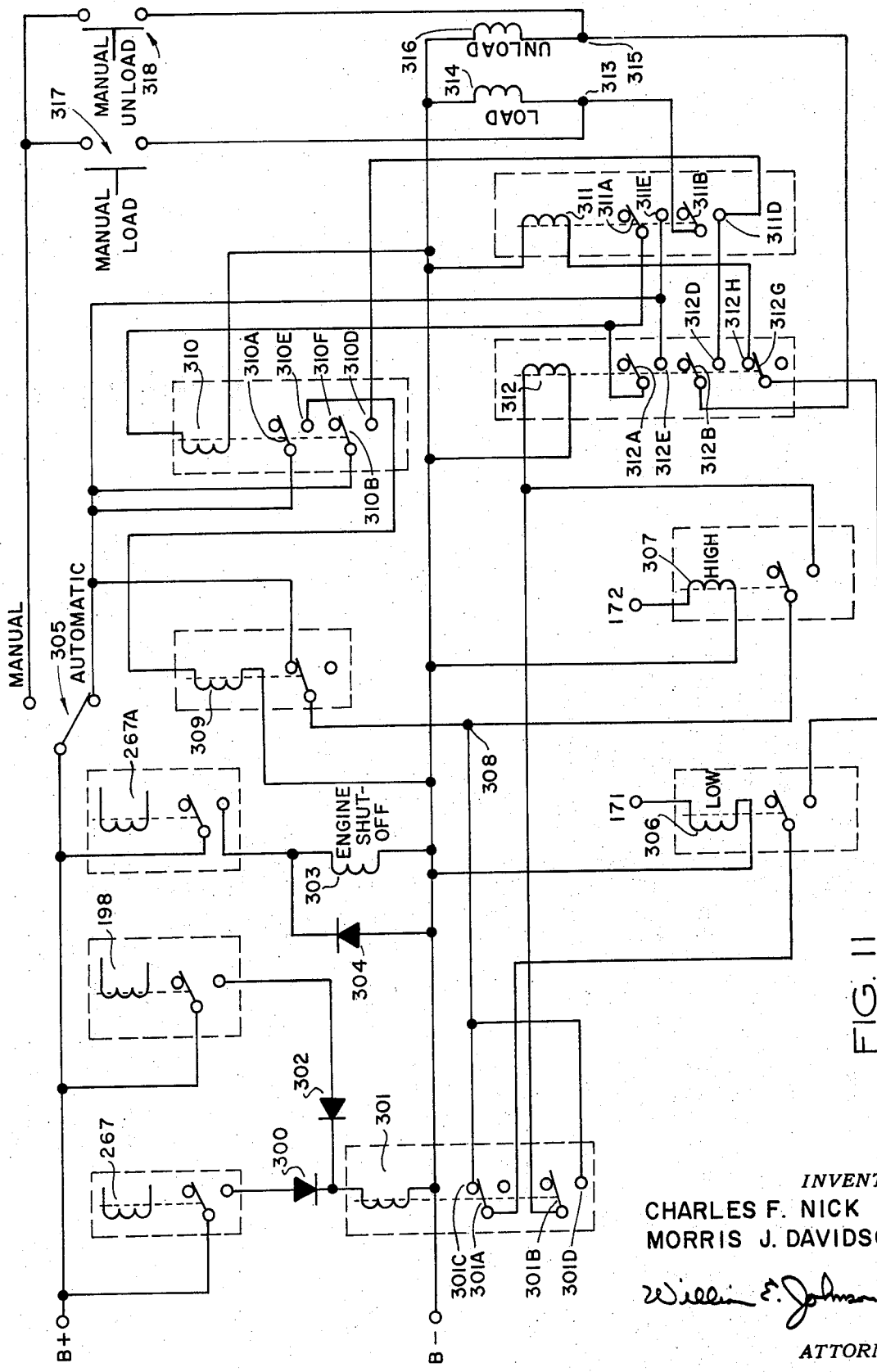

ENGINE TORQUE CONTROL SYSTEM

BACKGROUND OF THE INVENTION

This invention relates in general to a system for improving the performance of an internal combustion engine and refers more particularly to such a system for indicating the torque applied to the drive shaft by the engine and may be utilized to control the magnitude of such torque during operation of the engine by varying the driven load in response to such indicated torque.

The structural parts of an internal combustion engine are designed by the manufacturer for operation at a given engine torque — usually called "rated" torque. If the engine is operated above its rated torque, its structural parts are subjected to stresses above those for which they are designed. This shortens the service life of the engine. If it is operated far below its rated torque, its operating life is not shortened, but it is not producing the power to justify investment in that size of engine.

In addition, some engines have a so-called "up-rated" feature which allows them to be run under additional torque under certain conditions, as for example, within a given ambient temperature range.

Therefore, it is desirable to determine the actual torque which an engine is experiencing to allow adjustments to be made, if possible, to bring its actual torque as close as possible to that desired for the engine.

Various ways have been used heretofore to determine the actual torque on an engine. Among such prior art systems is that described in U.S. Pat. No. 3,444,730 to Joseph C. Bysarovich, assigned to the assignee of the present invention, wherein the mean effective pressure acting on a piston during a power cycle is measured as an indication of the engine torque. Various other torque control systems have also been known in the prior art, such as that described in U.S. Pat. No. 3,096,926 to Donald T. Koch et al wherein it is known to load and unload compressor pockets on a compressor driven by an engine to increase and decrease the torque on the engine. While such torque control systems have been moderately successful, the present invention is intended to introduce various safety factors and improved efficiencies which have heretofore been unknown in the prior art.

It is therefore the primary object of the present invention to provide a new and improved system for controlling the torque on an engine;

It is another object of the invention to provide an improved system for monitoring and controlling the torque on up-rated engines;

It is still another object of the invention to provide an improved system for computing the torque of an internal combustion engine;

It is a further object of the invention to provide additional safety features and an improved system for controlling the torque on an internal combustion engine.

The objects of the invention are accomplished, broadly, by a system which computes a signal functionally related to the actual torque of the engine and compares such actual torque signal with a desired torque set point signal and which adjusts the actual torque of the engine based upon such comparison. As an additional feature of the invention, the torque set point is compared to the allowable torque based upon a given engine condition to utilize any additional torque rating of the engine.

These and other objects, features and advantages of the invention will be apparent to those in the art from a reading of the following detailed specification and drawing, in which.

Figure 5:
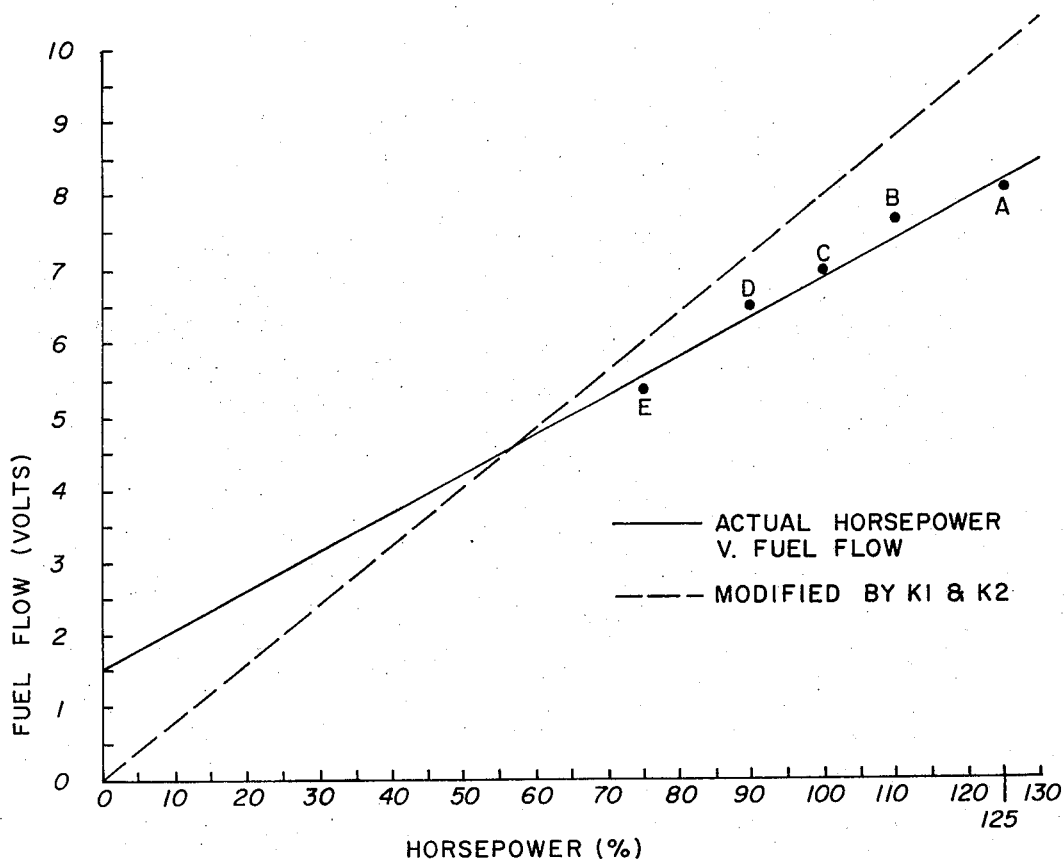
Figure 6:
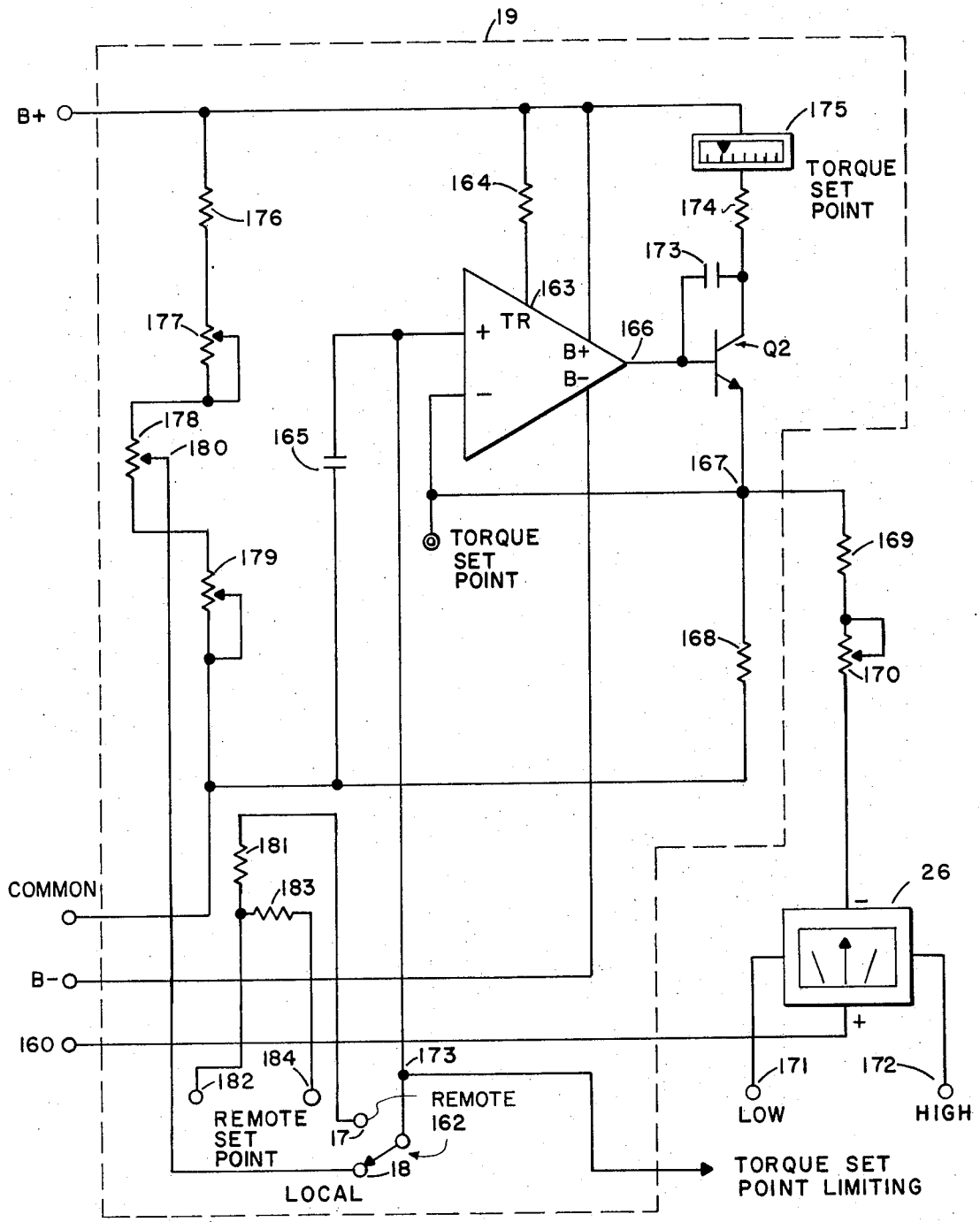
Figure 7:
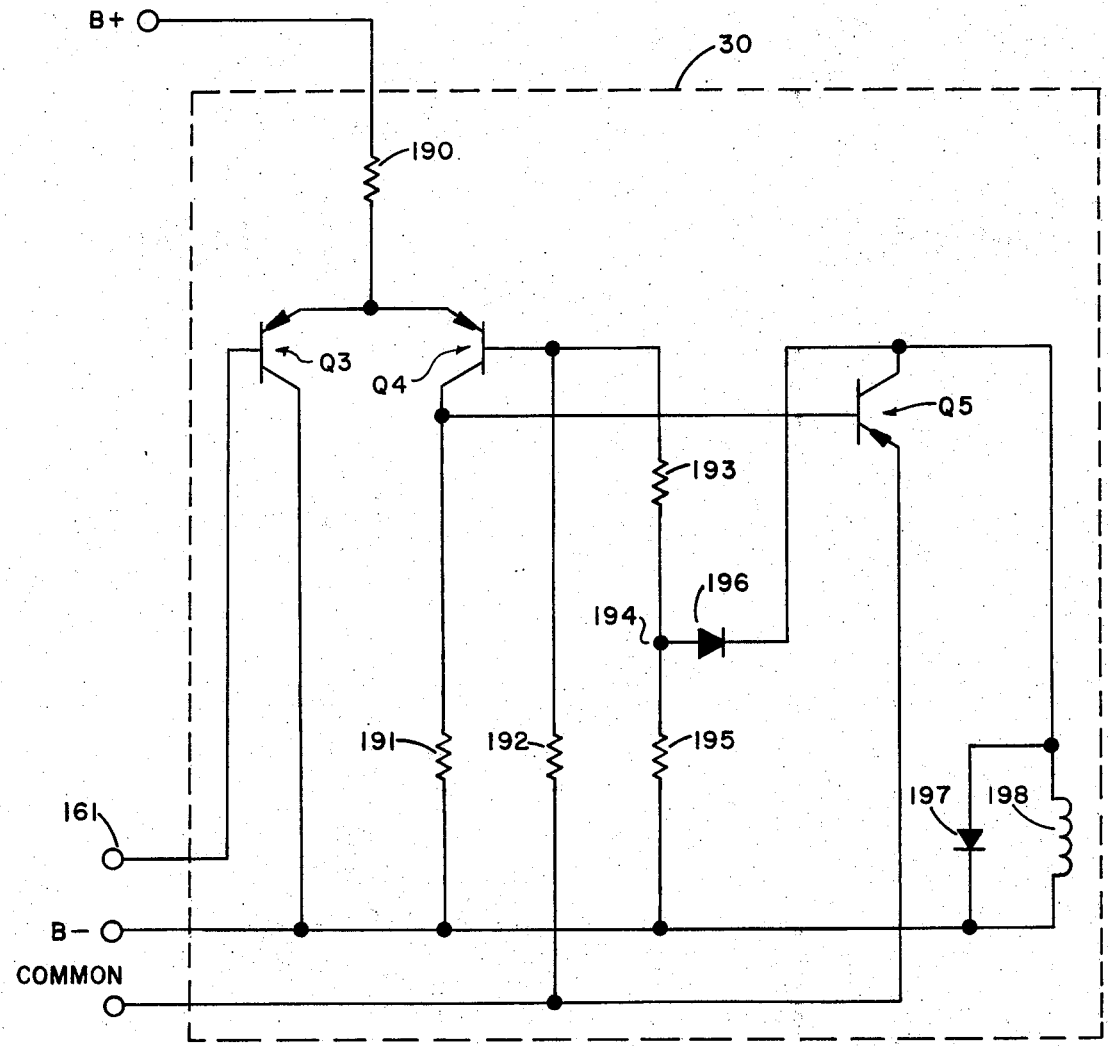
Figure 8:
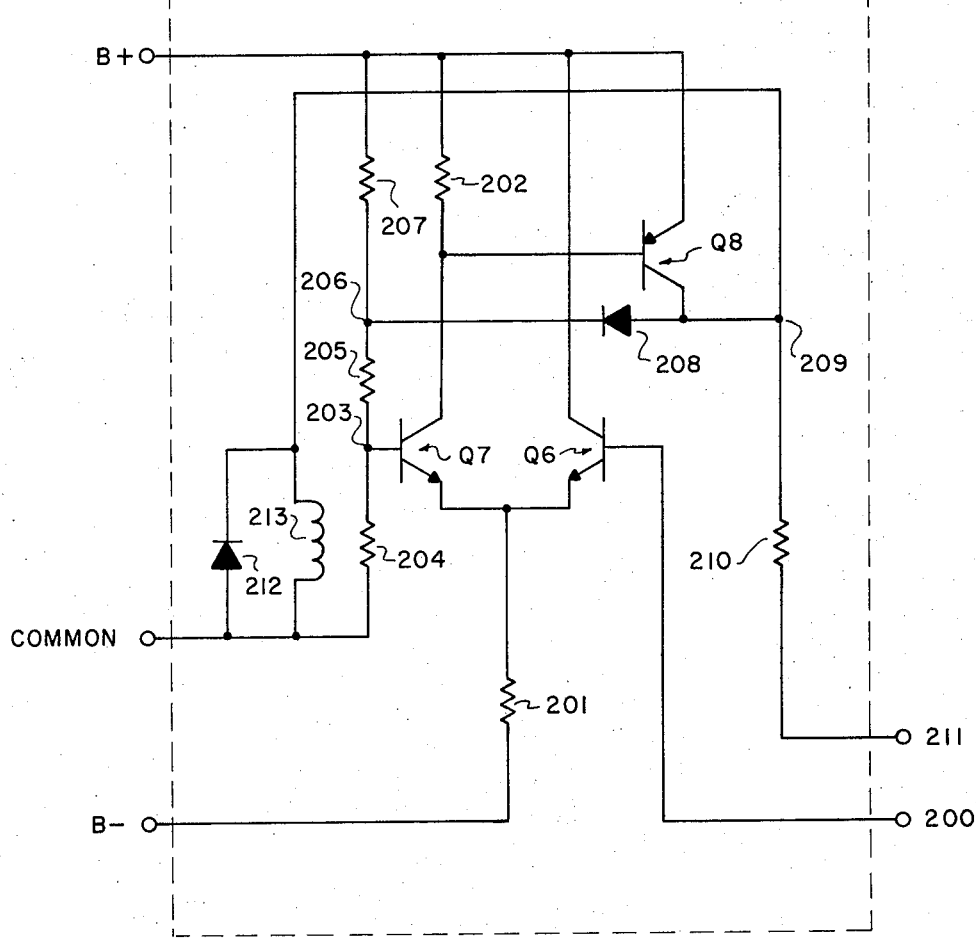
Figure 9:
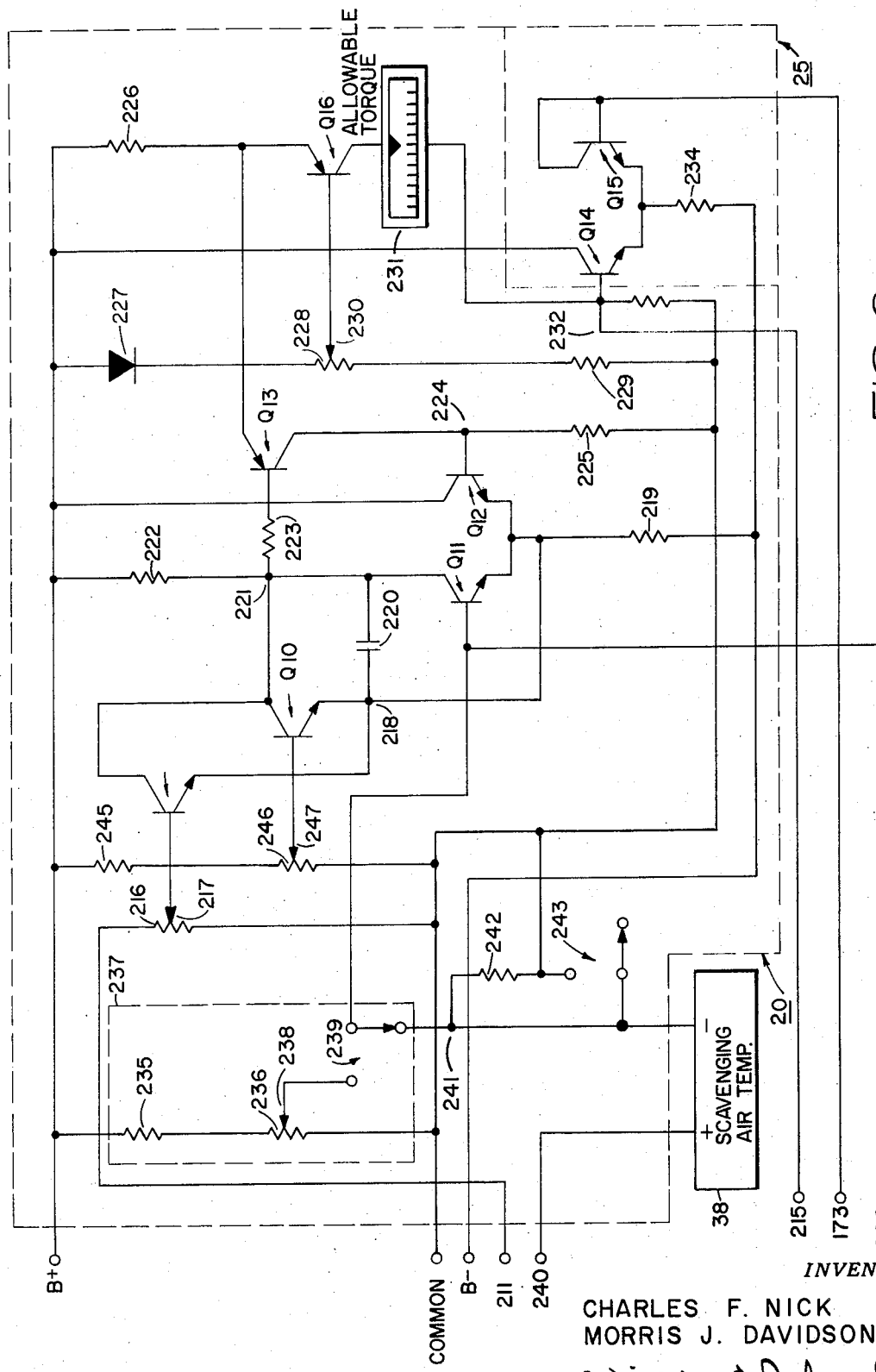
Figure 10:
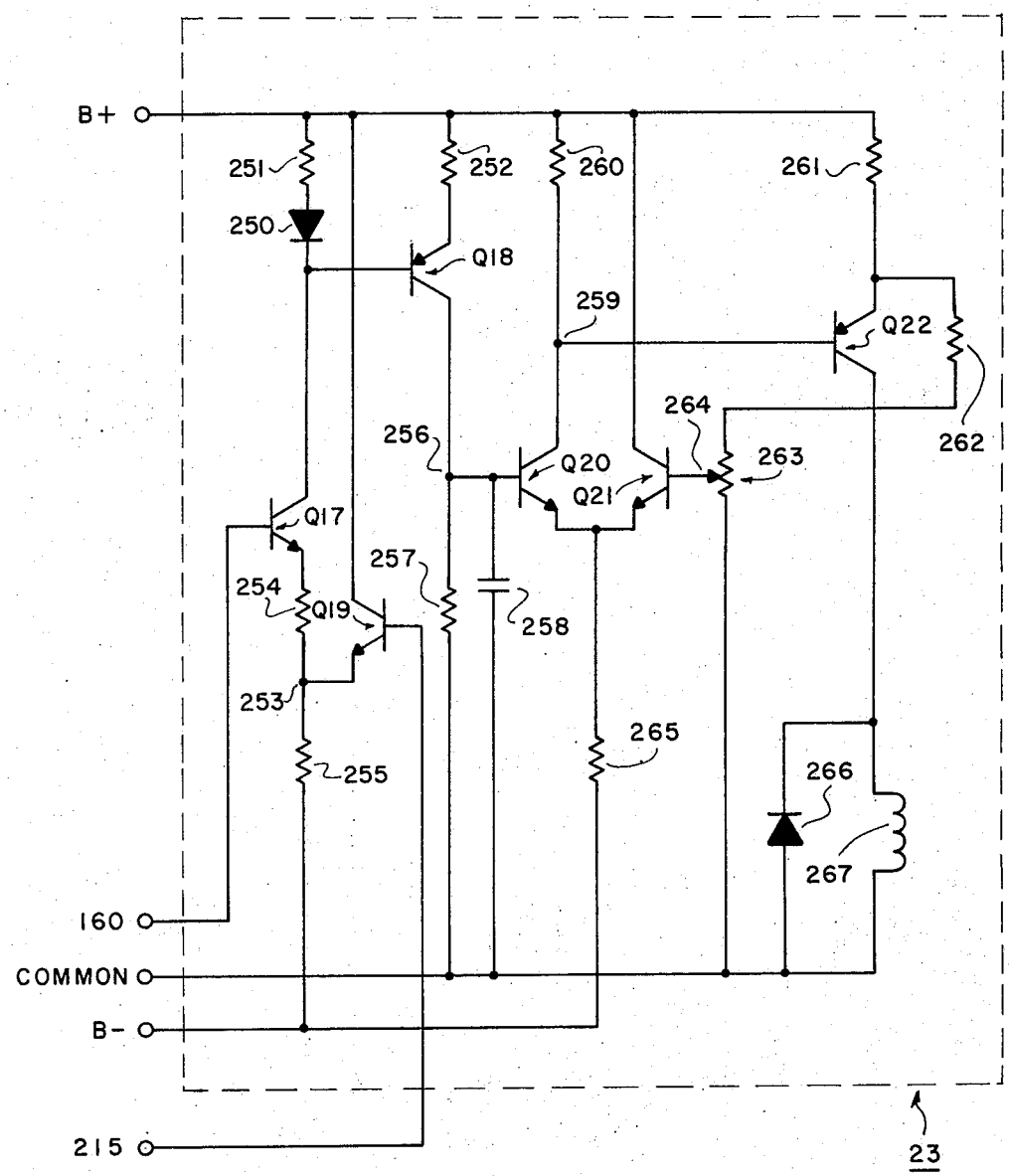

FIG. 5 schematically illustrates a curve of fuel flow versus horsepower of the engine;

FIG. 6 is a schematic illustration of circuitry for establishing the torque set point of the system according to the invention;

FIG. 7 is a schematic illustration of a circuit utilizing the loss of the torque signal in the system according to the invention;

FIG. 8 is a schematic illustration of a circuit utilizing the loss of the scavenging air temperature signal in the system according to the invention;

FIG. 9 is a schematic illustration of circuitry for establishing the allowable torque of the engine in the system and for comparing the actual torque of the engine and the allowable torque in the system according to the invention;

FIG. 10 is a schematic illustration of a circuit for establishing a high torque alarm and cut-off in the system according to the invention; and FIG. 11 schematically illustrates bi-directional switching circuits and timing circuits for use with the system according to the invention.

Referring now to the drawing in more detail, especially to FIG. 1, signals representative of the fuel differential pressure 10, the fuel static pressure 11 and the fuel temperature 12 are coupled into a fuel flow computer 13 which is explained in more detail hereinafter. The output of the fuel flow computer 13 is coupled through the horsepower circuitry 14 into the torque circuit 15. A signal representative of the engine speed 16 is also coupled into the torque circuit 15.

A remote station 17 and a local station 18 are used in the alternative to control the torque set point circuit 19 for establishing the torque percentage to be run on a given engine. An allowable torque circuit 20 which is controlled by a scavenging air temperature circuit 21 enables the system to be used with up-rated engines, i.e., those which are able to run at higher torques under the proper ambient temperature conditions. The output of the allowable torque circuit 20 is coupled back through a loss of scavenging air temperature circuit 22 and the circuit 22 is fed back into the allowable torque circuit 20 such that the loss of the scavenging air temperature signal reduces the allowable torque to some predetermined figure, for example, 100 percent. The output of the allowable torque circuit is compared with the output of the actual torque circuit 15 in a high torque alarm circuit 23 and in a high torque shut-down circuit 24.

The output of the desired torque set point circuit 19 is compared with the output of the allowable torque circuit 20 in a torque set point limiting circuit 25. The torque set point limiting circuit compares the torque set point signal with the allowable torque signal and selects the lower of the two. The output of the torque set point limiting circuit is then fed into a deviation detector 26 which has as its other input the actual torque from the torque circuit 15. The outputs of the deviation detector, having a "high" deviation and a "low" deviation output, are coupled into a timing circuit 27, the outputs of which are coupled into a bi-directional stepping circuit 28. The outputs of the bi-directional stepping circuit 28 are coupled into compressor clearance pockets 29. A loss of torque circuit 30 is also connected into the timing circuit 27 for unloading the compressor clearance pockets 29.

Figure 2:
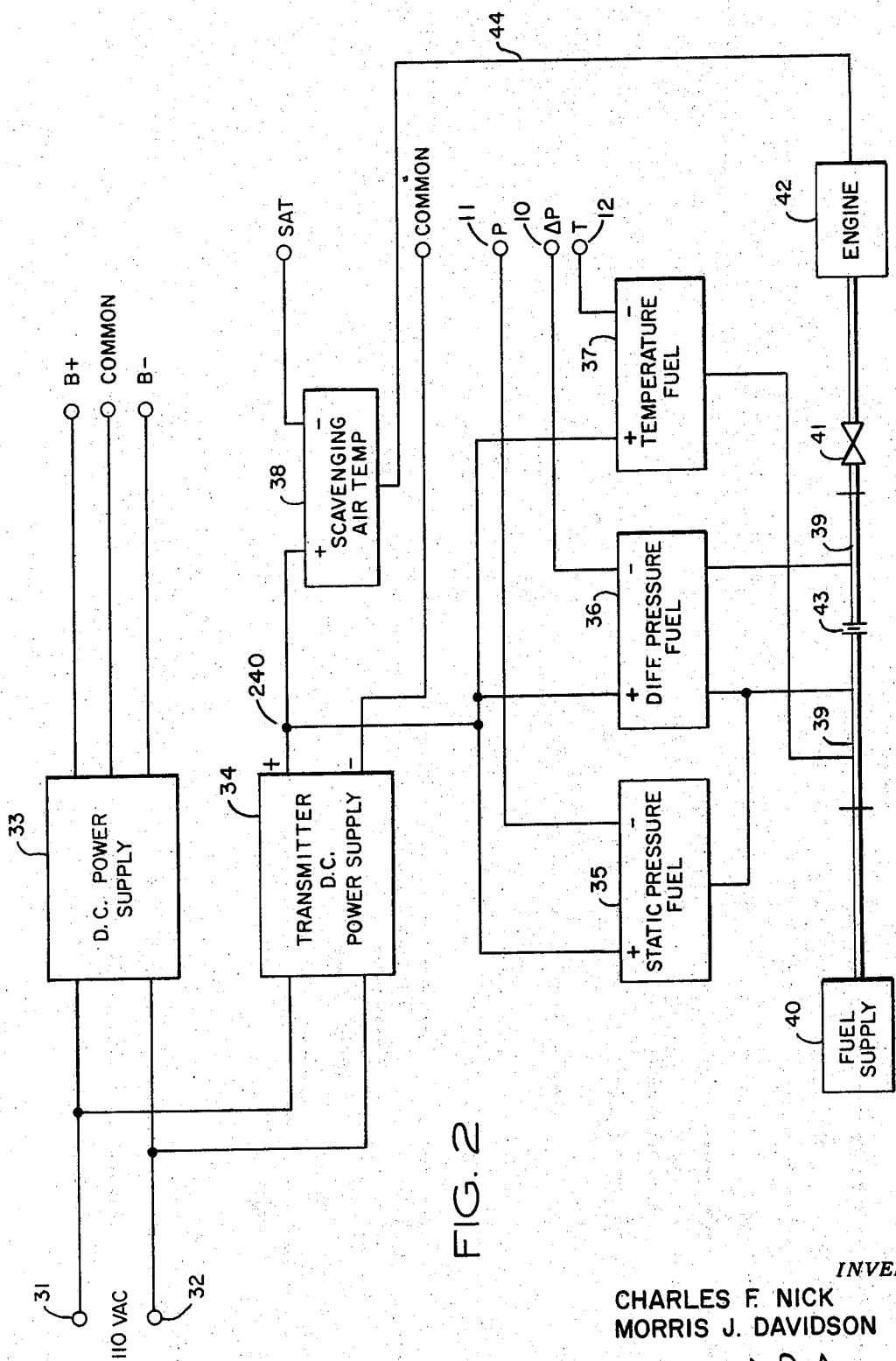
FIG. 2 is a schematic diagram of the power supplies, fuel low transmitters and scavenging air temperature transmitter according to the invention.

Referring now to FIG. 2, the 110 VAC power source (not illustrated) is connected into terminals 31 and 32 which drive a DC power supply 33, having outputs labeled B+, common and B−. The preferred embodiment contemplates that the B+ output will be a positive 15 VDC and the B− output will be a negative 15 VDC. The input terminals 31 and 32 also drive a transmitter DC power supply 34, preferably a regulated 45 VDC. The positive output of the power supply 34, shown generally by the numeral 240, is connected to the positive inputs of the fuel static pressure transmitter 35, the fuel differential pressure transmitter 36, the fuel temperature transmitter 37 and the scavenging air temperature transmitter 38, such transmitters being conventional and known in the art. The inputs to the static pressure transmitter 35, the differential pressure transmitter 36 and the fuel temperature transmitter 37 are connected into the meter tube 39 between the engine gas fuel supply 40 and the final fuel regulator 41 leading to the internal combustion engine 42. The inputs to the differential pressure transmitter 36 are connected across an orifice 43 in the meter tube 39. The input to the scavenging air temperature transmitter 38 is connected by conductor 44 to the engine 42. The outputs of the transmitters 35, 36, 37 and 38 are labeled P, $\Delta$P, T and SAT, respectively.

Figure 3:
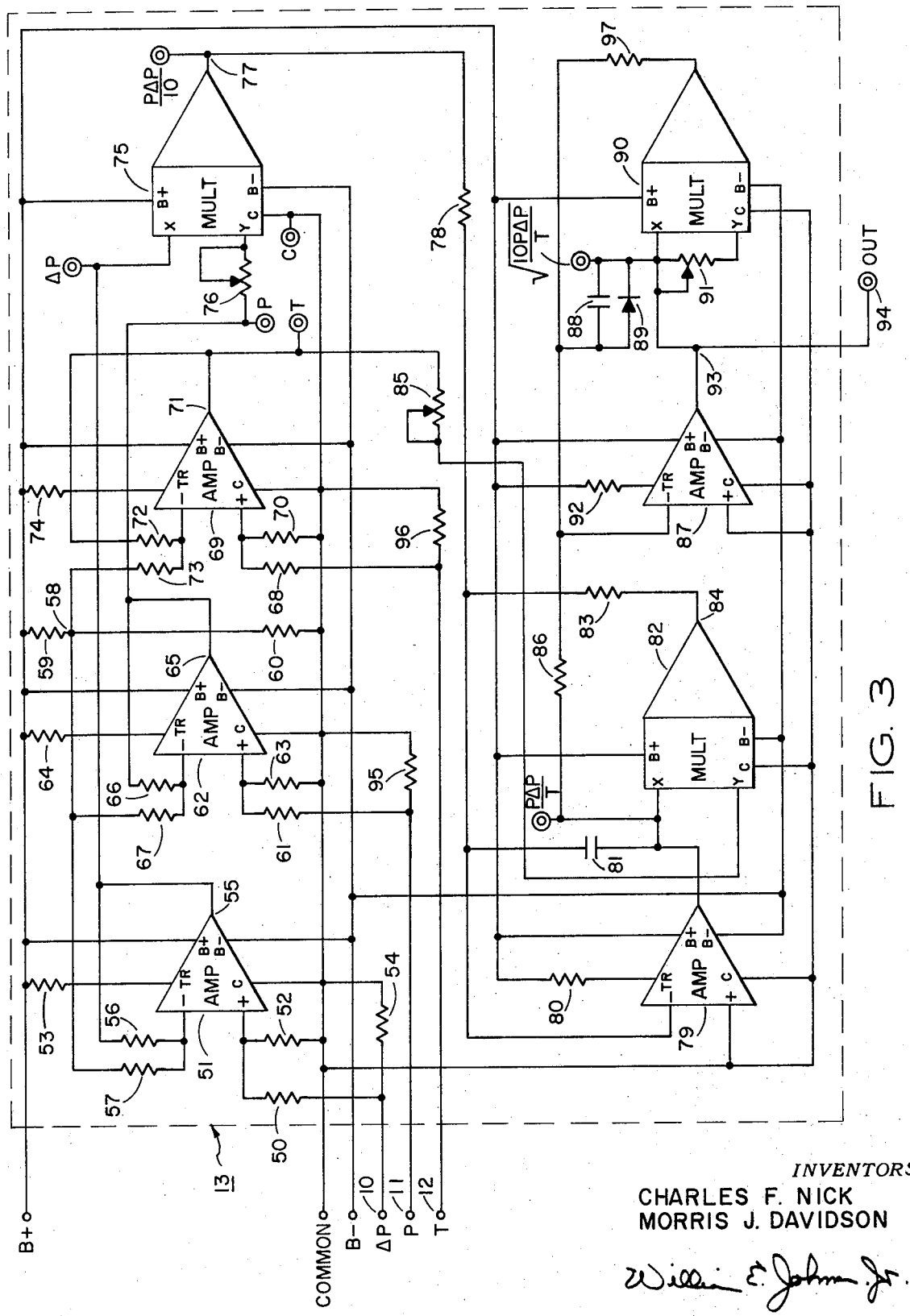
FIG. 3 is a schematic diagram of the circuitry for computing the engine fuel flow according to the invention.

Referring now to FIG. 3, there is illustrated in greater detail the circuitry of the fuel flow computer 13. A terminal 10, being functionally related to the fuel differential pressure signal, is connected through the resistor 50 to the positive input of the operational amplifier 51. The positive input of amplifier 51 is also connected through resistor 52 to common. The trim input of amplifier 51 is connected through resistor 53 to B+. The terminal 10 is also connected through resistor 54 to common. The output terminal 55 of amplifier 51 is connected through the resistor 56 to the inverting input of the amplifier 51. The inverting input of amplifier 51 is also connected through resistor 57 to the terminal 58 which in turn is connected to B+ by means of resistor 59 and by means of resistor 60 to common.

Terminal 11, having the static pressure signals thereon, is connected through resistor 61 to the positive input of amplifier 62 and through resistor 95 to common. The positive input of amplifier 62 is connected to common through resistor 63. The trim input of amplifier 62 is connected to B+ by means of resistor 64. The positive output terminal 65 of amplifier 62 is connected back to the inverting input of amplifier 62 through resistor 66. The inverting input of an amplifier 62 is also connected to junction 58 by means of resistor 67.

The terminal 12, having the fuel temperature signals thereon, is connected through the resistor 68 to the positive input of amplifier 69 and through resistor 96 to common. The positive input of amplifier 69 is also connected through resistor 70 to common. The output terminal 71 of amplifier 69 is connected to the inverting input of amplifier 69 by means of resistor 72. The inverting input of amplifier 69 is also connected to terminal 58 by means of resistor 73. The trim input to amplifier 69 is connected to B+ by means of resistor 74.

The output of amplifier 51 is also connected to the X input of the multiplier circuit 75. The output of amplifier 62 is connected through the potentiometer 76 to the Y input of the multiplier circuit 75.

The output terminal 77 of the multiplier circuit 75 is connected through resistor 78 to the inverting input of the amplifier 79, the positive input of amplifier 79 being connected to common. The trim input of amplifier 79 is connected through resistor 80 to B+. The output terminal 77 of multiplier circuit 75 is also connected by means of resistor 78 through the capacitor 81 to the X input of the multiplier circuit 82 and through the resistor 83 to the output terminal 84 of the multiplier 82. The output terminal of amplifier 79 is also connected to the X input of multiplier circuit 82. The output terminal 71 of amplifier 69 is connected through variable resistor 85 to the Y input of multiplier 82, whereas the X input of multiplier 82 is connected by means of resistor 86 to the inverting input of amplifier 87 and by means of the parallel combination of capacitor 88 and diode 89 to the X input of multiplier circuit 90. The X input of multiplier 90 is also connected through variable resistor 91 to the Y input of amplifier 90.

The trim input of amplifier 87 is connected through resistor 92 to B+. The output terminal 93 of amplifier 87 is connected to the X input of multiplier 90 and to the output terminal 94 which serves as the output for the overall circuit 13 of FIG. 3.

In the operation of the circuit of FIG. 3, it should be appreciated that the output of the amplifier 51 is a signal from 0 to +10 volts which is functionally related to $\Delta$P. The output of amplifier 62 is a signal from 0 to +10 volts which is representative of P. The output of amplifier 69 is a signal from 0 to +10 volts which is functionally related to T. The output of multiplier 75 appearing at terminal 77 is a signal from 0 to +10 volts which is functionally related to P$\Delta$P/10. The inverted signal appearing at the output of amplifier 79 is a signal from 0 to −10 volts functionally related to P$\Delta$P/T, whereas the signal appearing at the output terminal 94 is a signal from 0 to +10 volts functionally related to $\sqrt{10P\Delta P/T}$.

Figure 4:
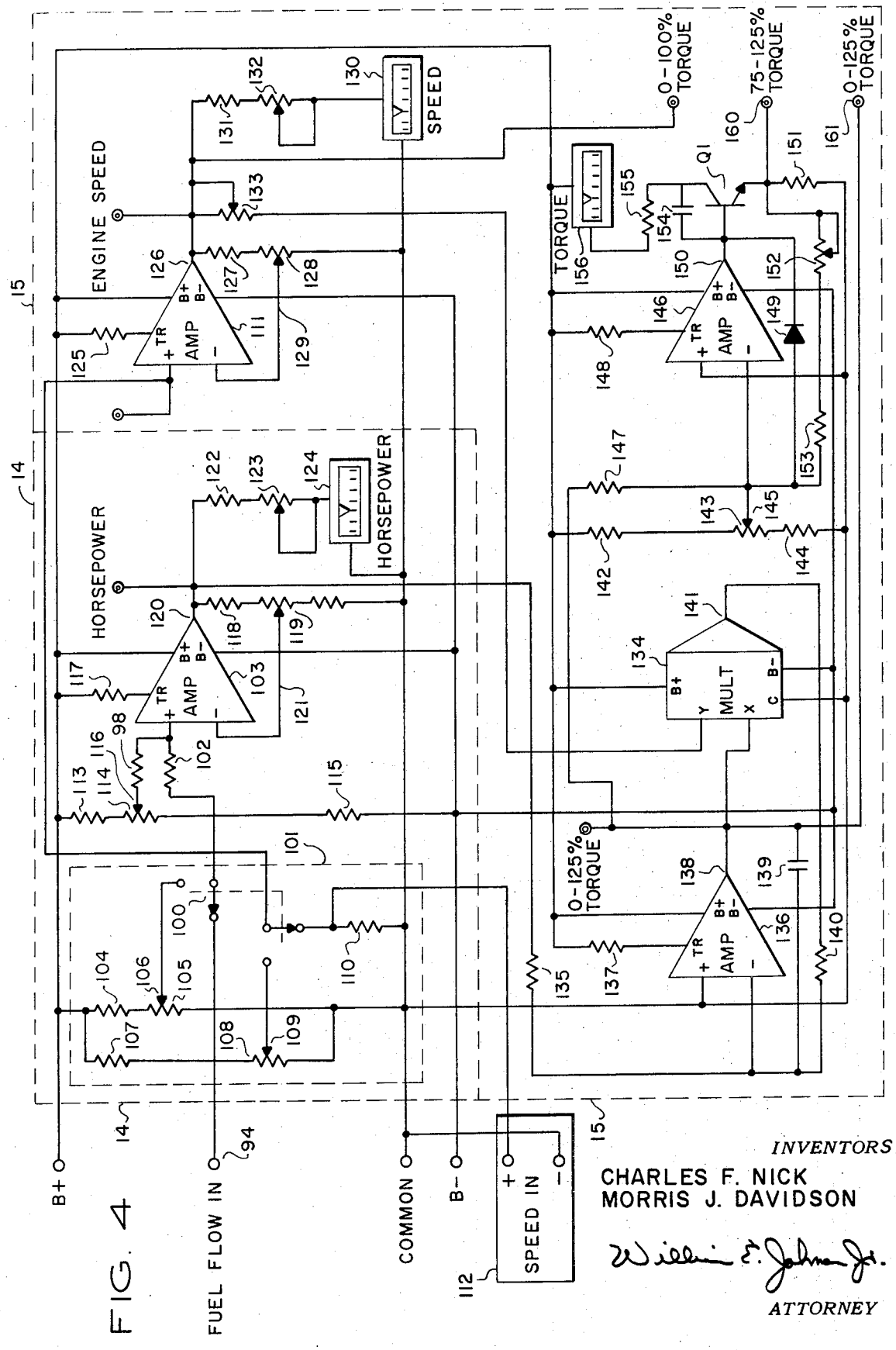
FIG. 4 is a block diagram of circuitry for computing the torque of the engine according to the invention.

Referring now to FIG. 4, the terminal 94, being representative of the computed fuel flow by the expression $\sqrt{10P\Delta P/T}$, is coupled through one of the poles of the ganged double pole switch 100 in the calibrator box 101 and through the resistor 102 to the positive input of amplifier 103. Within the calibrator 101, a resistor 104 is connected in series with a potentiometer 105 between B+ and common. The sliding arm 106 of the potentiometer 105 is connected to the normally open position of the switch 100. A resistor 107 is connected in series with a potentiometer 108 and parallel across the combination of the resistor 104 and potentiometer 105. The sliding arm 109 of the potentiometer 108 is connected to another normally open position of the other set of poles for the switch 100. The other normally closed pole is connected through a resistor 110 to common, the wiper arm being connected to the positive input of amplifier 111. Also connected to the non-common end of resistor 110 is the output of a tachometer 112 which is indicative of the speed of the engine 42 illustrated schematically in FIG. 2.

A resistor 113 is connected in series with a potentiometer 114 and the resistor 115 between B+ and B—. The sliding arm 116 of potentiometer 114 is connected to the positive input of amplifier 103. The trim input of amplifier 103 is connected to B+ by means of resistor 117. A resistor 118 and potentiometer 119 is connected in series between the output terminal 120 of amplifier 103 and common. The sliding arm 121 of potentiometer 119 is connected to the inverting input of amplifier 103. For reasons as set forth hereinafter, the potentiometer 114 is used for adjusting the zero offset of the output of amplifier 103 and the potentiometer 119 is used for adjusting the span of the output of amplifier 103. Also serially connected to the output terminal 120 of amplifier 103 is a resistor 122, a variable resistor 123 and a milliammeter 124 connected to common for indicating the horsepower output of the amplifier 103.

In the operation of the circuit 14 of FIG. 4 described so far, it should be appreciated that the fuel flow computation as discussed with respect to FIG. 3 is coupled into the terminal 94. This signal is coupled through the switch 100 into the amplifier 103. For ease of illustration, a chart in FIG. 5 shows the actual horsepower versus fuel flow by the solid line, this line having been drawn from the points A, B, C, D, and E. The extrapolation of this curve for the 0–125 percent horsepower is seen to be from about 1.5 volts to 8.1 volts. For ease of operation for the remainder of the system, through the use of the zero adjust potentiometer 114 and span adjust potentiometer 119, the curve is modified to go from 0–10 volts for the 0–125 percent horsepower. The dotted line, bearing the legend "modified by K1 and K2" refers to the potentiometers 114 and 119, respectively. Thus, it should be appreciated that the output of the amplifier 103 as seen at the output terminal 120 is a signal of 0 to +10 volts functionally related to the horsepower of the engine and having a relationship of 0–125 percent of the horsepower.

Referring again to FIG. 4, it should be appreciated that the resistor 104 and potentiometer 105 in the calibrator circuit 101 are put into operation by operating the switch 100 to thus put a calibrating voltage from the sliding arm 106 of the potentiometer 105 into the positive input of amplifier 103.

As previously mentioned, the output terminal of the tachometer 112 is coupled into the positive input of the amplifier 111. The trim input of amplifier 111 is connected to B+ through the resistor 125. The output terminal 126 of amplifier 111 is connected to the series combination of resistor 127 and potentiometer 128 to common. The sliding arm 129 of potentiometer 128 is connected to the inverting input of amplifier 111. A milliammeter 130 is connected between common and the output terminal 126 by means of a series combination of resistor 131 and variable resistor 132.

The output terminal 126 of amplifier 111 is also connected by means of variable resistor 133 to the Y input of multiplier 134. The output terminal 120 of amplifier 103, being functionally related to the horsepower of the engine, is connected by means of resistor 135 to the inverting input of amplifier 136. The positive input of amplifier 136 is connected to common. The trim input of amplifier 136 is connected by means of resistor 137 to B+. The output terminal 138 of amplifier 136 is connected by means of capacitor 139 to the inverting input of amplifier 136. The inverting input of amplifier 136 is also connected by means of resistor 140 to the output terminal 141 of multiplier 134. The output terminal 138 of amplifier 136 is connected to the X input of multiplier 134. It should be appreciated that the output terminal 138 is functionally related to 0–125 percent of the torque of the engine.

A series combination of resistor 142, potentiometer 143 and resistor 144 is connected between B+ and common. The sliding arm 145 of potentiometer 143 is connected to the inverting input of amplifier 146 and also through resistor 147 to the output terminal 138 of amplifier 136. The trim input to amplifier 146 is connected by means of resistor 148 to B+. A diode 149 is connected between the inverting input of amplifier 146 and the output terminal 150 of amplifier 146. The output terminal 150 is also connected to the base of transistor Q1, with the emitter of transistor Q1 being connected through a resistor 151 to common and also through a variable resistor 152 and resistor 153 series combination to the inverting input of amplifier 146. A capacitor 154 is connected between the base and collector of transistor Q1. The collector of transistor Q1 is also connected to B+ by means of a resistor 155 in series with a milliammeter 156 which is indicative of the torque of the engine. The emitter of transistor Q1 is connected to output terminal 160 and the output terminal 138 of amplifier 136 is connected to output terminal 161.

In operation of the circuit 15 according to FIG. 4, it should be appreciated that the output terminal 126 of amplifier 111 is indicative of 0–100 percent engine speed and that the output terminal 138 of amplifier 136 and output terminal 161 is indicative of 0–125 percent torque due to the relationship of torque being equal to horsepower divided by engine speed. It should also be appreciated that by a proper setting of the potentiometer 143 and variable resistor 152 that the output appearing on the emitter of transistor Q1 and on output terminal 160 is easily adjustable to the range of 75–125 percent torque.

Figure 1:
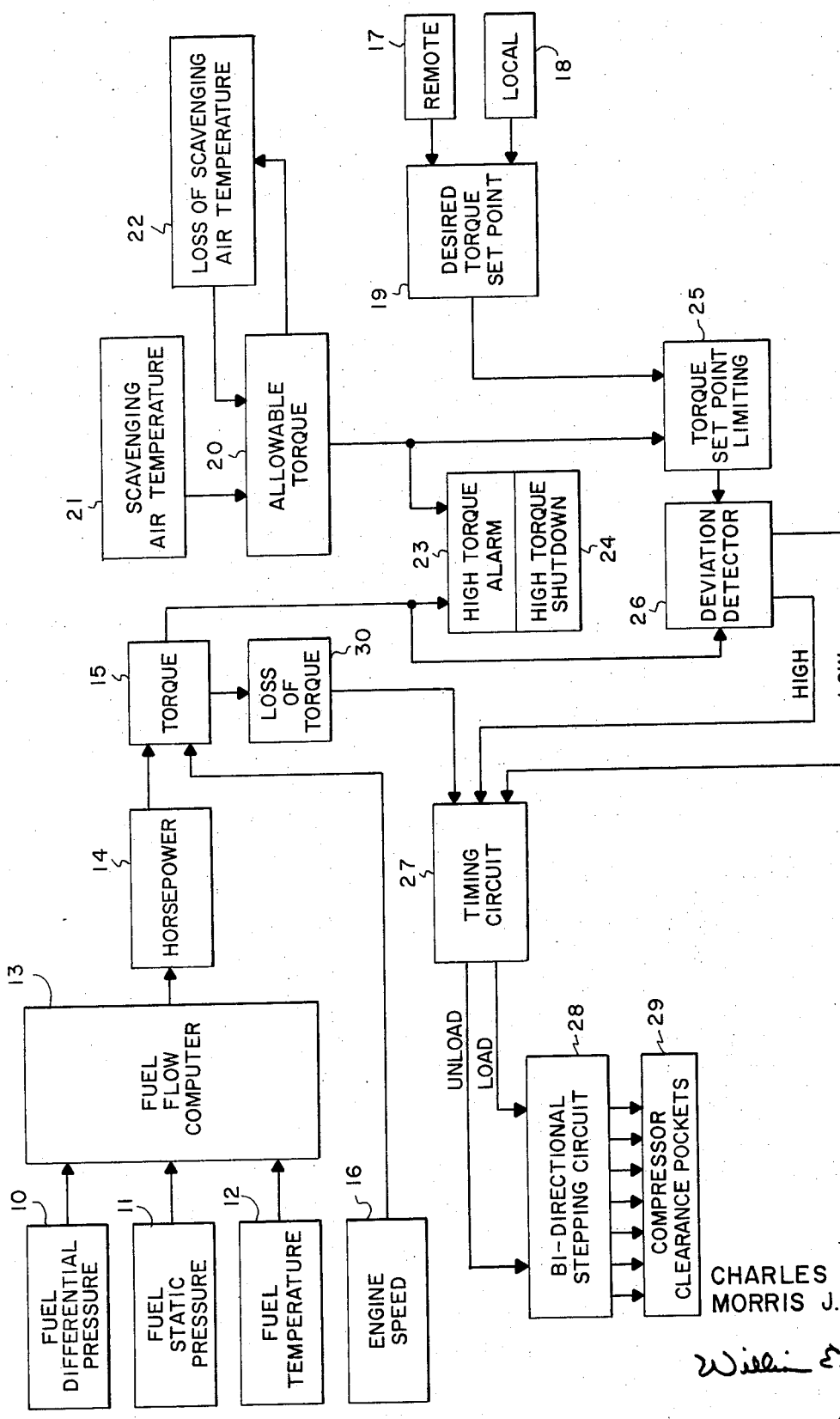
FIG. 1 is a block diagram of the complete system according to the invention.

Referring now to FIG. 6, the desired torque set point circuit 19 shown in block diagram in FIG. 1 is illustrated in greater detail. A switch 162, illustrated as being in contact with the "local" terminal 18, has its wiper arm connected to the positive input terminal of the operational amplifier 163. The trim input of amplifier 163 is connected by means of resistor 164 to B+. The positive input of amplifier 163 is also connected by means of capacitor 165 to common. The output terminal 166 of amplifier 163 is connected to the base of transistor Q2 whose emitter is tied to junction 167 which in turn is connected back to the inverting input of amplifier 163. The junction 167 is connected to common through resistor 168 and also through the series combination of resistor 169 and variable resistor 170 to the torque deviation meter and relay combination 26, theother side of which is driven by the signal appearing at junction 160 which, as was pointed out with respect to FIG. 4, is indicative of 75–125 percent actual torque on the engine. The deviation relay 26 has a pair of output terminals 171 and 172 which are labeled "low" and "high," the purpose of which will be explained hereinafter.

A capacitor 173 is connected between the collector and base of the transistor Q2. A resistor 174 is connected in series combination with a milliammeter 175 indicative of the torque set point between B+ and the collector of transistor Q2.

A resistor 176 is connected in series with a variable resistor 177, a potentiometer 178 and a variable resistor 179 between B+ and common. The wiper arm 180 of the potentiometer 178 is connected to the "local" terminal 18.

The "remote" terminal 17 is connected by a resistor 181 to terminal 182. The terminal 182 is connected to terminal 184 by means of resistor 183.

In operation of the circuit of FIG. 6, it should be appreciated that depending upon whether local or remote operation of the set point circuit is desired, the switch 162 is switched between terminals 17 and 18. Assuming local operation, the voltage developed upon the wiper arm 180 of potentiometer 178 in the voltage divider between B+ and common is coupled into the positive input of amplifier 163. The desired torque set point, having a voltage range of 1-5 volts indicative of a 75-125 percent desired torque set point, is thus coupled into the negative side of the deviation meter in relay 26. The actual engine torque signal appearing at terminal 160 is coupled into the positive side of the deviation meter in relay 26. The relay 26 remains inoperative so long as there is a small enough deviation between actual torque and the desired torque set point. In the event of a high deviation, i.e., the actual torque exceeds the desired torque set point by a predetermined amount, the high deviation contact in the meter 26 will be activated and a signal will appear at terminal 172. Conversely, in the event the actual torque is less than the desired torque set point by a predetermined amount, the low deviation contact will be activated and a signal will appear at the terminal 171. It should be appreciated, however, that the desired torque set point is limited by the allowable torque as explained hereinafter as determined by the voltage appearing at terminal 173 entitled "torque set point limiting."

In the event it is desired to use a "remote" set point, the switch 162 is switched to "remote" and an external voltage can be applied at terminals 182 and 184 in a similar manner as was discussed with respect to the local operation of the system.

Referring now to FIG. 7, the terminal 161 is connected to the base of transistor Q3, the transistor Q3 havings its collector tied to B−. The emitter of transistor Q3 is connected to the emitter of transistor Q4 and also through resistor 190 to B+. The collector of transistor Q4 is tied through resistor 191 to B−. The base of transistor Q4 is connected through resistor 192 to common and through resistor 193 to the junction 194. The junction 194 is connected through resistor 195 to B− and through diode 196 to the collector of the transistor Q5 whose base is connected to the collector of transistor Q4. The emitter of transistor Q5 is connected to common. The collector of transistor Q5 is also connected to the parallel combination of diode 197 and the coil of relay 198, each of which has its other side connected to B−.

In the operation of the circuit of FIG. 7, so long asthe signal appearing at 161, being representative of a signal from 0–10 volts and from 0–125 percent torque appears on the base of transistor Q3, the transistor Q3 is on and the transistor Q4 is biased off. Upon loss of the signal at terminal 161, transistor Q3 is turned off and transistor Q4 starts to turn on. This action turns on transistor Q5 which drives transistor Q4 even further on. This saturates transistor Q5 and develops enough voltage across the coil of relay 198 to activate the relay 198, thus being indicative of a loss of torque signal at the terminal 161. The purpose for providing such a loss of torque signal will be explained hereinafter.

Referring now to FIG. 8, there is illustrated and described a circuit which is nearly identical to that of FIG. 7 except for the inverted nature of the transistors and the polarities of the various circuit components and power supplies. The terminal 200 is connected to the base of transistor Q6 whose emitter is connected to the emitter of transistor Q7 and also through resistor 201 to B−. The collector of transistor Q6 is connected to B+ and the collector of transistor Q7 is connected through resistor 202 to B+. The collector of transistor Q7 is also connected to the base of transistor Q8 whose emitter is connected to B+. The base of transistor Q7 is connected to a junction 203 and from that junction through resistor 204 to common. Junction 203 is also connected through resistor 205 to junction 206 which is connected through resistor 207 to B+. Junction 206 is also connected through diode 208 to the collector of transistor Q8 and the junction 209. The junction 209 is connected through resistor 210 to terminal 211. The junction 209 is also connected to the parallel combination of diode 212 and the coil of the relay 213, each of which has its other side connected to common.

In the operation of the circuit of FIG. 8, for reasons as set forth hereinafter with respect to FIG. 9, the signal appearing at terminal 200 is representative of the scavenging air temperature and has a signal range of +1 to +5 volts DC. So long as the scavenging air temperature appears at terminal 200, transistor Q6 is turned on and transistor Q7 is turned off. As the signal at junction 200 is lost, the transistor Q7 starts to turn on and this in turn begins to turn on transistor Q8. This further turns on transistor Q7 which in turn drives Q8 into saturation and thus produces a voltage at terminal 209 which is adequate to activate the relay 213 and produce an output signal at 211, which as will be explained hereinafter with respect to FIG. 9 is used as a consequence of the loss of signal in terminal 200.

Referring now to FIG. 9, the terminal 211, also referred to in FIG. 8, is connected to one end of a potentiometer 216, the other end of which is connected to common. The sliding arm 217 of potentiometer 216 is connected to the base of transistor Q9. The emitter of transistor Q9 is connected to junction 218 which in turn is connected to the emitter of transistor Q10 and to the emitters of transistors Q11 and Q12 and through resistor 219 to B−. The junction 218 is also connected to capacitor 220, to the collector of transistor Q11 and to junction 221 which in turn is connected to the collectors of transistors Q9 and Q10 and through the resistor 222 to B+ and through the resistor 223 to the base of transistor Q13. The base of transistor Q12 is connected to the junction 224 which in turn is connected to the collector of transistor Q13 and through the resistor 225 to common. The emitter of transistor Q13 is connected to the emitter of transistor Q16 which is connected through resistor 226 to B+. A diode 227 is connected in series with a potentiometer 228 and a resistor 229 between B+ and common with the sliding arm 230 of the potentiometer 228 being connected to the base of transistor Q16. The collector of transistor Q16 is connected in series with a milliammeter 231, labeled as "allowable torque," the other end of which is connected to junction 232 which is connected to common by means of resistor 233. The junction 232 is also connected to junction 215 and to the base of transistor Q14. The emitter of Q14 is connected to the emitter of transistor Q15, each of which is connected through resistor 234 to B—. The base and collector of transistor Q15 are connected together and also to terminal 173.

A resistor 235 is connected in series with a potentiometer 236 between B+ and common to form the calibrator circuit 237. The sliding arm 238 of potentiometer 236 is connected to the normally open terminal of switch 239 with the wiper arm of switch 239 connected to the base of transistor Q11. The base of transistor Q11 is also connected to terminal 200. A resistor 245 is connected in series with a potentiometer 246 between B+ and common. The sliding arm 247 of potentiometer 246 is connected to the base of transistor Q10. The scavenging air temperature transmitter 38 is connected to the normally closed terminal of switch 239, the positive input to the transmitter 38 being connected to terminal 240 of the transmitter DC power supply 34 as illustrated in FIG. 2. The negative side of the transmitter 38 is also connected to junction 241 which in turn is connected through resistor 242 to common. The negative side of transmitter 38 is also connected to the wiper arm of switch 243 shown in its normally open position. The other terminal of the switch 243 is connected to common.

In the operation of the allowable torque circuit of FIG. 9, identified generally by the numeral 20, the input from the scavenging air temperature transmitter 38 is applied either to terminal 241 to develop a voltage drop across the resistor 242 or, alternatively, the switch 243 is closed to shunt the temperature signal directly to common. The position of the switch 243 can be either one of manual operation or automatic, for example, in response to the speed of the engine or some other such parameter. With the switch 243 in the position as illustrated, the overall circuit can be used with up-rated engines to utilize additional allowable torque.

In calibrating the circuit 20, the switch 239 is utilized to provide a voltage input from the potentiometer arm 238 to drive the base of the transistor Q11.

The resistance of the resistor 226 is chosen such that the current through the resistor 226 remains essentially constant. Thus, the amount of scavenging air temperature signal appearing at the base of Q11 is determinative of the current shunted away from the allowable torque meter 231. The biasing of transistor Q11 is such that Q11 conducts with about 3 volts base drive, being representative of 70° F. scavenging air temperature. Thus, with between 3 and 5 volts base drive the transistor Q11 conducts and the shunt current path away from the meter 231 is through transistor Q13, resistor 223, transistor Q11 and resistor 219 to B—. When the base drive on transistor Q11 drops below 3 volts (thus below 70° scavenging air temperature), transistor Q11 cuts off and transistor Q10 takes over. This circuit is used to avoid overdriving of the allowable torque meter 231. With such a condition, the shunt path is through the transistor Q13, resistor 223, transistor Q10 and resistor 219 to B—.

As previously stated, it is desirable that a complete loss of the scavenging air temperature signal should cause the allowable torque circuit to be clamped at 100 percent allowable. As p eviously mentioned with respect to FIG. 8, the loss of the scavenging air temperature signal results in an increased voltage at terminal 211. This produces a voltage upon the potentiometer arm 217 and gives a base drive to the transistor Q9. The transistors Q9, Q10 and Q11 are biased such that the base drive to the transistor Q9 causes transistors Q10 and Q11 to be cut off. Transistor Q9 is then used for the shunt path of the current away from the allowable torque meter 231, thus clamping the allowable torque at 100 percent.

The current which does pass through the allowable torque meter 231 develops a voltage drop across resistor 233, thus providing a voltage potential at junction 232. As the current through the torque meter 231 decreases, the voltage appearing at terminal 232 decreases and also the voltage on the base of resistor Q15 decreases, thus providing a lower voltage output at terminal 173.

Referring again to FIG. 6, with a decreased allowable torque, the voltage appearing at terminal 173 is lowered and thus the input to the amplifier 163 can never exceed the voltage appearing at terminal 173. That is, the torque set point can never exceed that of the allowable torque. Referring again to FIG. 9 in conjunction with the circuit of FIG. 6, it is seen that the two circuits in combination compare the allowable torque with the torque set point and choose the lower of the two voltages.

Referring now to FIG. 10, the terminal 160 is connected to the base of transistor Q17. The collector of transistor Q17 is connected to B+ by means of the series combination of diode 250 and resistor 251. The collector of transistor Q17 is also connected to the base of transistor Q18, the emitter of transistor Q18 being connected to B+ through resistor 252. The emitter of transistor Q17 is connected to terminal 253 by means of resistor 254, the terminal 253 being joined to B— by means of resistor 255. The junction 253 is also connected to the emitter of transistor Q19, the collector of such transistor being tied directly to B+. The base of transistor Q19 is connected to terminal 215. The collector of transistor Q18 is connected to terminal 256, such terminal also being connected to common by means of resistor 257. The terminal 256 is also connected to the base of transistor Q20 and to common by means of capacitor 258. The collector of transistor Q20 is connected to junction 259 which in turn is connected to B+ by means of resistor 260. The junction 259 is also connected to the base of transistor Q22 whose emitter is connected to B+ by means of resistor 261. The emitter of transistor Q22 is also connected to common by means of the series combination of resistor 262 and potentiometer 263 whose wiper arm 264 is connected to the base of transistor Q21. The emitters of transistors Q20 and Q21 are connected together and are connected to B— by means of resistor 265. The collector of transistor Q22 is connected to common by means of the parallel combination of diode 266 and the coil of the relay 267. The base of transistor Q19 is connected to terminal 215.

In the operation of the circuit of FIG. 10, the signal appearing at terminal 160 is representative of the 75–125 percent actual engine torque, being a +1 to +5 volt DC signal. The signal appearing at terminal 215 is representative of the 75–125 percent allowable torque, being a +1 to +5 volt DC signal. In the overall operation of the circuit of FIG. 10, identified generally by the numeral 23 in FIGS. 1 and 10, a comparison is made between the actual torque and the allowable torque in order to sound an alarm should the actual torque exceed the allowable torque by too great a percentage amount. As the signal at terminal 160 increases, the current through resistor 251 increases, thus causing the current through resistor 252 to increase. This in turn causes a voltage drop across the resistor 257 to increase by an amount proportional to the difference between the actual and allowable torque signals. The increased voltage across the resistor 257, appearing at terminal 256 with respect to common, causes transistor Q20 to begin to turn on and causing the transistor Q21 to begin cutting off. This decreases the voltage appearing at the emitter of transistor Q22, and causes additional cut-off on the transistor Q21. The transistor Q22 is thus switched into saturation and causes activation of the relay 267. The potentiometer 263 is used to select the sensitivity for activating the meter for a given percentage difference between the signals appearing at terminals 160 and 215. The circuit of the preferred embodiment contemplates that such an activation of the relay 267 will occur with a 6 percent difference between the actual torque and the allowable torque.

The high torque shut-down circuit identified by the numeral 24 in FIG. 1 is identical to that of the circuit 23 and thus need not be illustrated. It should be appreciated that the only difference between the two circuits lies in the sensitivity setting of the potentiometer 263 and the preferred embodiment contemplates that the shut-off relay similar to the alarm relay 267 used with the high torque shut-down circuit is set to activate at an approximate difference of 10 percent between the allowable torque and the actual torque. Thus, when the actual torque exceeds the allowable torque by 6 percent, the high torque alarm relay would be activated, causing a red light (not illustrated) to be activated and if desired an audible alarm such as a horn or whistle. When the difference is seen to be 10 percent, the high torque shut-down relay would be activated and used to shut the engine off.

The circuit components and values for the circuits heretofore described with respect to FIGS. 1–10 are as follows:

TRANSISTORS

| | | | | | |
|---|---|---|---|---|---|
| Q1 | 2N1711 | Q9 | 2N1711 | Q17 | 2N1711 |
| Q2 | 2N1711 | Q10 | 2N1711 | Q18 | 2N2905 |
| Q3 | 2N2905 | Q11 | 2N1711 | Q19 | 2N1711 |
| Q4 | 2N2905 | Q12 | 2N1711 | Q20 | 2N1711 |
| Q5 | 2N1711 | Q13 | 2N2905 | Q21 | 2N1711 |
| Q6 | 2N1711 | Q14 | 2N1711 | Q22 | 2N2905 |
| Q7 | 2N1711 | Q15 | 2N1711 | | |
| Q8 | 2N2905 | Q16 | 2N2905 | | |

CAPACITORS (microfarads)

| | | | | | |
|---|---|---|---|---|---|
| 81 | 100 | 154 | 0.1 | 220 | 0.1 |
| 88 | 100 | 165 | 20 | 258 | 250 |
| 139 | 0.1 | 173 | 0.1 | | |

DIODES

| | | | | | |
|---|---|---|---|---|---|
| 89 | 1N2071 | 197 | 1N2071 | 227 | 1N2071 |
| 149 | 1N2071 | 208 | 1N2071 | 250 | 1N2071 |
| 196 | 1N2071 | 212 | 1N2071 | 266 | 1N2071 |

RESISTORS (ohms)

| | | | | | |
|---|---|---|---|---|---|
| 50 | 46.4K | 86 | 10K | 128 | 2K |
| 52 | 46.4K | 91 | 5K | 131 | 9.09K |
| 53 | 24K | 92 | 24K | 132 | 1K |
| 54 | 250* | 95 | 250* | 133 | 5K |
| 56 | 46.4K | 96 | 250* | 135 | 46.4K |
| 57 | 46.4K | 97 | 10K | 137 | 24K |
| 59 | 1.25K | 98 | 196K | 140 | 46.4K |
| 60 | 250 | 102 | 196K | 142 | 825 |
| 61 | 46.4K | 104 | 825 | 143 | 500 |
| 63 | 46.4K | 105 | 2K | 144 | 215 |
| 64 | 24K | 107 | 38.3K | 147 | 46.4K |
| 66 | 46.4K | 108 | 500 | 148 | 24K |
| 67 | 46.4K | 110 | 61.9 | 151 | 250 |
| 68 | 46.4K | 113 | 1K | 152 | 20K |
| 70 | 46.4K | 114 | 500 | 153 | 38.3K |
| 72 | 46.4K | 115 | 1K | 155 | 240 |
| 73 | 46.4K | 117 | 24K | 164 | 24K |
| 74 | 24K | 118 | 46.4K | 168 | 250 |
| 76 | 5K | 119 | 20K | 169 | 147K |
| 78 | 10K | 122 | 9.09K | 170 | 20K |
| 80 | 24K | 123 | 1K | 174 | 240 |
| 83 | 10K | 125 | 24K | 176 | 2.15K |
| 85 | 5K | 127 | 46.4K | 177 | 1K |
| 178 | 1K | 210 | 2.2K | 242 | 100** |
| 179 | 500 | 216 | 2K | 245 | 2.15K |
| 181 | 1K | 219 | 3.9K | 246 | 1K |
| 183 | 250 | 222 | 3.9K | 251 | 2.15K |
| 190 | 3.9K | 223 | 3.9K | 252 | 825 |
| 191 | 3.9K | 225 | 250 | 254 | 511 |
| 192 | 240 | 226 | 182 | 255 | 3.9K |
| 193 | 2.2K | 228 | 2K | 257 | 825 |
| 195 | 1K | 229 | 2.15K | 260 | 3.9K |
| 201 | 3.9K | 233 | 250 | 261 | 100 |
| 202 | 3.9K | 234 | 2.2K | 262 | 2.15K |
| 204 | 240 | 235 | 3.83K | 263 | 1K |
| 207 | 1K | 236 | 2K | 265 | 3.9K |

* This value (250 ohms) should be used for input currents of 10–50 milliamps. For 4–20 milliamps, use 625 ohms. For 1–5 milliamps, use 2.5 K ohms.

** This value (100 ohms) should be used for input current of 10–50 milliamps. For 4–20 milliamps, use 250 ohms. For 1–5 milliamps, use 1K ohms.

Referring now to FIG. 11, there is schematically illustrated in greater detail the combination of timing circuit 27 and the bi-directional stepping circuit 28 of FIG. 1. The high torque alarm relay 267 is illustrated as having its normally open contact point connected through diodes 300 to the coil of control relay 301, the other side of the coil being connected to B−. The Loss of Torque relay 198 is shown as having its normally open contact connected also to the coil of relay 301 through diode 302. The wiper arms for the relays 198 and 267 are each connected to B+. The High Torque Shut-off relay 267A, being of a similar nature as that of relay 267 as discussed heretofore with respect to FIG. 10, is illustrated as having its wiper arm connected to B+ and its normally open contact connected to an engine shut-off solenoid 303 and its parallel diode 304, the other ends of each being connected to B−. A switch 305 is shown as being switchable between the manual and automatic positions. The switch 305 enables the loading or unloading of the compressor pockets to be done in the manual or automatic modes. The wiper arm of the switch 305 is connected to B+.

The terminal 171 is connected to the coil of "LOW" relay 306, the wiper arm of relay 306 being connected to the wiper arm 301A of relay 301. A relay 307 is connected to the input terminal 172, the relay being labeled "HIGH." The wiper arm of relay 307 is connected to a junction 308, such junction also being connected to the normally closed contact terminal 301C associated with the wiper 301A and also to the normally open contact 301D associated with the wiper arm 301B of the relay 301.

The junction 308 is also connected to the wiper arm of the time delay de-energizer relay 309, the normally closed position of such relay being connected to the automatic mode of B+. The relay 309 is conventional and in its normal mode of operation, is energized immediately and de-energized only after a predetermined time, for example, 10 seconds. One side of the coil for the relay 309 is connected to B— whereas the other side of the coil is connected to the normally open contact terminal 310E associated with the wiper arm 310A of the time delay energized relay 310. The time delay energized relay 310 is conventional and is energized after some predetermined time interval, for example, 20 seconds. The wiper arm 310A of relay 310 is connected to B+. The wiper arm 310B of the relay 310 is also connected to B+. The normally open contact terminal 310D associated with the wiper arm 310B is connected to the normally open contact terminals 311D and 312D of the control relays 311 and 312, respectively.

The wiper arm 301B of relay 301 and the normally open contact of relay 307 are each connected to one side of the coil for relay 312, the other side of the coil being connected to B—. The normally open contact of relay 306 is connected to the wiper arm 312G of the relay 312. The normally closed contact terminal 312H associated with the wiper arm 312G of the relay 312 is connected to one side of the coil of relay 311, the other side of the coil being connected to B—. The wiper arm 312A of the relay 312 is connected to one side of the coil of the relay 310, the other side of the relay 310 being connected to B—. The wiper arm 312A is also connected to the wiper arm 311A of the relay 311. The normally open contact terminal 311E associated with the wiper arm 311A of relay 311 and the normally open contact terminal 312E associated with the wiper arm 312A of relay 312 are each joined together and are connected directly to the automatic mode of B+.

The wiper arm 311B of the relay 311 is connected to the junction 313 which in turn is connected to the "LOAD" solenoid 314, the ther side of which is connected to B—. The wiper arm 312B of relay 312 is connected to the junction 315, which in turn is connected to one side of the "UNLOAD" solenoid 316, the other side of which is connected to B—.

Also connected to the junction 313 is a manual load switch 317, the other side of which is connected to the manual mode of B+. Also connected to the junction 315 is a manual unload switch 318, the other side of which is connected to the manual mode of B+.

In the operation of FIG. 11, when the switch 305 is put in the automatic mode, B+ is applied through the normally closed contact of relay 309 to the junction 308. This also places B+ upon the normally closed contact 310C of the relay 301 and the normally open contact point 301D of the relay 301. This also places B+ upon the normally open contact of the relay 306 and upon the normally open contact of relay 307. In the event a signal appears at terminal 171 indicative of a low deviation in the relay meter 26 of FIG. 6, the relay 306 is activated and the B+ signal is applied to the normally closed contact 312H of relay 312 and to the coil of relay 311. This action then causes the voltage at 311E to be applied to the wiper arm 311A and thus to the time delay relay 310. After a predetermined time delay, for example, 20 seconds, the relay 310 is activated and B+ is applied from wiper arm 310B to the contact 310D within the relay 310 and thus from the contact 311D to the wiper arm 311B within the relay 311 to the load relay 314. This action also causes B+ to be applied from the wiper arm 310A to the contact 310E within the relay 310 to thus apply voltage to the time delay relay 309. As previously mentioned, the relay 309 energizes immediately and de-energizes after a predetermined time interval, for example, 10 seconds. Thus, after the voltage is applied to the relay 309, the relay 309 is immediately energized and the B+ is removed from the junction 308. Shortly thereafter, the circuitry is ready to look again at the load condition on the engine and determine whether additional loading or unloading should be accomplished. The delay action of the relay 310 serves to prevent loading or unloading of the engine in the event of transient conditions and can be set for any desired delay.

In the event a signal occurs at input terminal 172, indicative of high deviation in the meter 26 of FIG. 6, the relay 307 is activated, thus causing B+ to be applied to the coil 312 and the activation thereof. B+ is thus applied from the contact 312E to the wiper arm 312A within the relay 312 and thus to the delay relay 310. After the predetermined time delay aforementioned, B+ is applied from the wiper arm 310F to the contact 310D within the relay 310 to thus apply voltage from the contact 312D to the wiper arm 312B within the relay 312 and thus to the "UNLOAD" relay 316. Likewise as aforementioned, the activation of the relay 310 causes B+ to be applied from the wiper arm 310A to the contact 310E within the relay 310 and thus to the coil of the time delay relay 309 which is energized immediately and is de-energized after a predetermined time interval.

Thus, with either high or low deviation torque signals, the load or unload relays 314 and 316 are energized to load or unload the compressor pockets to affect the torque on the engine.

Although not illustrated, the "LOAD" and "UNLOAD" relays 314 and 316 can be used to control the loading of a single compressor pocket, or preferably can be used to drive a conventional bi-directional, multi-pole switch which controls a plurality of compressor pockets. It should be appreciated that with such a device, it is preferable to arrange a set of relay contacts to prevent loading or unloading at the extreme ends of the switch.

During the operation of the system, should the relay 198 be energized, indicating that there has been a loss of the torque signal, B+ is applied through the diode 302 to energize the relay 301. This action causes B+ to be applied from the contact 301D to the wiper arm 301B and thus to the coil of the relay 312. This action causes B+ to be applied from the contact 312E to the wiper arm 312A of the relay 312 and thus to the coil of the time delay relay 310. As previously discussed, after the predetermined time delay, B+ is applied from the wiper arm 310F to the contact 310D of the relay 310 and thus to the contact 312D and wiper arm 312B of relay 312 and from there to the unload relay 316. Also as previously mentioned, the activation of the relay 310 causes the time delay 309 to be activated and thus open its contacts for the predetermined time interval.

In the event that the relay 267 should be activated, indicating that the actual torque has exceeded the allowable torque by a given percentage, B+ is applied through the diode 300 to the relay 301 and the circuit acts in the same manner as was discussed with respect to the activation of the relay 198.

In the event relay 267A is activated, being equivalent to the relay 267 except being based upon a higher percentage difference between allowable torque and the actual torque as was discussed with respect to the high torque shut-down circuit with regard to FIG. 10, B+ is then applied to the engine shutoff solenoid 303 to thus avoid damage to the engine.

Should it be desired to operate in the manual mode, rather than the automatic mode, the switch 305 is thus placed in the manual position and B+ can be applied to the load relay 314 by the manual load switch 317 or to the unload relay 316 by the manual unload switch 318.

Thus, it should be appreciated that there has been illustrated and described herein a system which in a new and improved way computes the fuel flow of an internal combustion engine, converts such computed fuel flow into horsepower of the engine and thereafter uses the horsepower of the engine with the monitored engine speed to produce an electrical signal indicative of the torque on the engine. It should also be appreciated that means have been provided herein to establish a desired torque set point, to establish a signal indicative of the allowable torque on the engine based upon the scavenging air temperature in use with the engine to compare the allowable torque with the desired torque set point and thus to limit the set point by the amount of allowable torque. It should furthermore be appreciated that means have been provided herein for comparing the actual torque with the torque set point as limited by the allowable torque and to adjust the loading or unloading of compressor clearance pockets based upon the difference between the actual torque and the limited torque set point. Although specific examples have been set forth in illustrating and describing the preferred embodiments of the invention, obvious modifications to the embodiments shown herein will be apparent to those skilled in the art. For example, other parameters could be used to modify the allowable torque rather than the scavenging air temperature of the engine. For example, this could be accomplished by cooling the ambient air surrounding the engine. Furthermore, upon the loss of the parameter which is used to adjust the allowable torque, for example, the scavenging air temperature, the allowable torque could be clamped at some figure other than 100 percent, for example, 95 percent or 105 percent. Likewise, the invention contemplates that other means of measuring and indicating the torque on the engine can be used with the system according to the present invention. For example, the torque measurement as described in the aforementioned Bysarovich patent could be utilized in the block diagram up to and including the torque circuit 15 with the remainder of the circuitry as illustrated by the block diagram of FIG. 1.

The embodiments of the invention in which an exclusive property or privilege is claimed are defined as follows:

1. A system for controlling the torque on an engine, comprising:
   an engine;
   means connected to said engine for generating a first electrical signal functionally related to such torque;
   means for generating a second electrical signal indicative of a desired torque set point;
   means for comparing said first and said second electrical signals to establish the deviation therebetween;
   means connected between said comparison means and said engine to vary the torque on said engine based upon said deviation; and
   means for generating a third electrical signal functionally related to a performance characteristic of the engine and means for limiting the amplitude of said second electrical signal with said third electrical signal.

2. A system for monitoring and controlling the torque on an engine, comprising:
   an engine;
   means connected to said engine for generating a first electrical signal functionally related to such torque;
   means for generating a second electrical signal indicative of a desired torque set point;
   means connected to said engine for generating a third electrical signal functionally related to a performance characteristic of the engine;
   means for selecting either said second or said third electrical signal;
   means for comparing said first signal with said selected signal to establish the deviation therebetween; and
   means connected between said comparison means and said engine to vary the torque on said engine based upon said deviation.

3. The system according to claim 2 wherein said means to vary the torque includes time delay means to lessen spurious variations in the torque due to transient conditions.

4. The system according to claim 2 wherein said means for selecting is based upon the smaller of the second and third signals being selected.

5. The system according to claim 4, including in addition thereto, means for limiting said third electrical signal to a predetermined amplitude level in the event of loss of the functional relationship between said performance characteristic and said third electrical signal.

6. The system according to claim 5, including in addition thereto, means for limiting said third electrical signal to a level functionally related to 100 percent of the allowable torque on the engine in the event of said loss.

7. The system according to claim 2 wherein said performance characteristic is the scavenging air temperature of the engine.

8. The system according to claim 2 wherein said means for selecting is based upon the smaller of the second and third signals being selected wherein said performance characteristic is the scavenging air temperature of the engine.

9. A system for computing and controlling the torque of an internal combustion engine, comprising:
   an engine;
   means connected to said engine to generate a first electrical signal functionally related to the static pressure of the fuel feeding said engine;

means connected to said engine to generate a second electrical signal functionally related to the differential pressure of the fuel feeding said engine;

means connected to said engine to generate a third electrical signal functionally related to the temperature of the fuel feeding said engine;

electrical circuit means to combine said first, second and third signals to generate a fourth electrical signal functionally related to the horsepower of the engine;

means to generate a fifth electrical signal functionally related to the speed of the engine;

means to combine said fourth and fifth electrical signals to generate a sixth electrical signal functionally related to the torque on the engine; and being further characterized as including an electrical reference torque point;

means to compare said sixth electrical signal with said torque point; and means connected to said engine to vary the torque on said engine based upon said comparison.

* * * * *